UNITED STATES PATENT OFFICE.

SADAKICHI SATOW, OF SENDAI, JAPAN.

SAUCE AND PROCESS OF MAKING THE SAME.

1,332,448. Specification of Letters Patent. Patented Mar. 2, 1920.

No Drawing. Application filed May 5, 1917. Serial No. 166,620.

*To all whom it may concern:*

Be it known that I, SADAKICHI SATOW, a subject of the Emperor of Japan, residing at Sendai, Japan, have made a certain new and useful Invention in Sauces and Processes of Making the Same, of which the following is a specification.

This invention relates to food sauces, and particularly to the Japanese sauce shoyu, and the process of making the same.

The object is to provide a food sauce in the form of a dry powder, which can be cheaply manufactured and marketed and which may be kept indefinitely without spoiling.

Most table sauces in liquid form, and especially the Japanese sauce shoyu, spoil very quickly from mold, due to the presence therein of carbohydrates, nitrogeneous matters, inorganic matters and micro-organisms. Moreover, such product, in liquid form, requires care in packing and shipping, is bulky and difficult to handle.

It is among the special purposes of my present invention to provide a table sauce which avoids these and other objections, and which is economical to manufacture.

The materials employed by me in carrying out my invention are soja beans, wheat, barley or other suitable grain, common salt, koji or koji extract, and water. The soja beans furnish the main nutritive body for the final product. The wheat, barley, or other grain supplies a desirable color and flavor as well as a nutritive body to the product. The salt acts as an antiseptic and supplies a saline taste, but principally its presence prevents alcoholic or other harmful fermentation by preventing the growth of deleterious ferments, such as lactic, acetic, and butyric acid ferments, and the like, during the fermenting stage of the process. The koji, or koji extract saccharifies the starch content of the mass, and also supplies enzyms for the decomposition of the proteids and any oil present in the mass. The water serves simply as a diluent and to reduce the mass to liquid form.

The operation, according to one illustrative example, is carried out as follows:

The soja beans, say one hundred pounds, are first immersed in warm or hot water and allowed to stand over night. This causes the beans to swell up. The beans are then crushed or ground into a thick mass. The wheat, barley or other grain, say thirty to fifty pounds is roasted until it attains a dark brown color. Ordinarily this will be accomplished in a few minutes under proper roasting temperature and conditions. The roasted grain is then crushed or ground to a powder. The roasted and ground grain is then mixed with the pasty soja bean mass. To this mixed mass is then added water to the amount of two to five times the volume of the mass, and the mass is thoroughly stirred. Common salt, say about ten to twenty pounds, is then added. An enzymic and saccharifying agent such as koji, koji extract, takakoji, or takakoji extract in the proportion, say of about 5% to 20% by weight of the mass is then added. The mass is then maintained at a temperature of 70° F. to 85° F., until thorough fermentation takes place. This will require three months or longer according to the temperature at which the mass is maintained. During the fermentation period the starch contained in the mass is saccharified and the proteids are converted into soluble form which further decomposes and forms amino-acids, which impart a delicious taste and flavor to the final product. Alcoholic or other harmful fermentation which would destroy the liquid for the production of shoyu or sauce is prevented by the presence of the salt in the solution. After the completion of the fermentation the liquid is separated from the residue and filtered and then evaporated to dryness under high vacuum, say 29 inches, and low temperature say 40° F. to 60° F., for instance by using a vacuum drum drier. The dried mass is then crushed or ground into a powder and is ready for use or to pack and ship, for sale. The residue may also be dried under vacuum and crushed into powder and used as a food product.

By the operation above described a high yield of final product is attained with very little residue. There is no tendency of the final dry powder product to mold for the reason that micro-organisms require moisture to propagate their growth, and this condition is not present in the dry powder as described.

The drying operations described do not destroy or decompose the amino-acids or other complex organic compounds which impart the delicious taste and characteristic flavor to the sauce, and particularly to shoyu and which would be the case if ordinary shoyu, as at present manufactured in liquid form, were evaporated to dryness at ordinary pressure and high temperature. Moreover, the useful enzyms of the raw materials remain in their natural state, unaltered and unchanged, in the dry powder product, and consequently such product possesses high digestive and nutritive value. This would not be the case if ordinary pressures and high temperatures are employed.

The sauce powder is easily soluble into a clear transparent solution in water, and the solution possesses the same taste and flavor as shoyu before evaporation. The powder keeps indefinitely, is convenient to handle, pack and ship, and may be applied in use like salt and pepper are ordinarily applied, without being passed into a solution.

Having now set forth the objects and nature of my invention and the manner of carrying the same into practical effect, what I claim as new and useful and of my own invention and desire to secure by Letters Patent is:—

1. In the manufacture of sauce powder, the process which consists in mixing together soja bean, roasted grain, salt, water and koji, then fermenting the mass, and finally reducing the same to dryness under high vacuum and low temperature.

2. The process which consists in mixing together soja bean, roasted grain, water and koji, then fermenting the mass and preventing alcoholic or other harmful fermentations during the fermenting action, then separating the liquid from the residue and filtering the same, and finally evaporating the clarified solution to dryness under high vacuum and low temperature and reducing the mass to a powder.

3. The process which consists in reducing soja bean to a pasty mass, then mixing with such mass roasted and powdered grain and water, then fermenting the mass with koji, and adding salt to prevent the alcoholic or other harmful fermentation thereof, and separating and clarifying the resulting liquid and finally evaporating the clarified liquid to dryness under high vacuum and low temperature.

4. The process which consists in fermenting, without forming alcohol, a liquid containing soja bean, roasted grain, common salt and water and a saccharifying and enzymic agent, and then evaporating the fermented solution to dryness under high vacuum and low temperature.

5. As a new article of manufacture, a sauce in the form of a dry powder containing vegetable proteidal substances, enzyms, amino-acids, salt and carbohydrates and free from alcoholic ferments and oils.

6. As a new article of manufacture a sauce in the form of a fermented vegetable proteidal substance reduced to powder and containing enzyms, amino-acid, carbohydrates and salt, and which is soluble in water and free from alcoholic ferments and oils.

7. The process which consists in mixing together soja bean, roasted grain, water and koji, then fermenting the mass and preventing with common salt alcoholic or other harmful fermentations in the mass, then separating the liquid from the residue, and finally drying the residue.

In testimony whereof I have hereunto set my hand on this 30th day of April, A. D. 1917.

SADAKICHI SATOW.